United States Patent [19]
Chandler et al.

[11] Patent Number: 5,229,751
[45] Date of Patent: Jul. 20, 1993

[54] APPARATUS CONTAINING TIME-SENSITIVE FLUID WITH AN INDICATION AS TO THE STATE OF THE FLUID

[76] Inventors: Curt M. Chandler, 2933 Jessup Rd., Cincinnati, Ohio 45239; Rick G. Hubbard, 11155 Spinner Ave., Cincinnati, Ohio 45241; Jerry E. Cravens, 10966 U.S. Rte. 68, Midland, Ohio 45148

[21] Appl. No.: 790,676
[22] Filed: Nov. 8, 1991
[51] Int. Cl.$^5$ ............................................. G08B 21/00
[52] U.S. Cl. .................................... 340/618; 340/620; 73/304 R; 99/285
[58] Field of Search ............... 340/618, 619, 620, 621, 340/622; 73/304 R, 304 C, 302; 99/279, 285

[56] References Cited
U.S. PATENT DOCUMENTS

| | | | |
|---|---|---|---|
| 2,448,149 | 8/1948 | Moomjian | 99/285 X |
| 3,060,835 | 10/1962 | Eads et al. | 340/620 X |
| 3,757,316 | 9/1973 | Fiorenzo | 340/620 X |
| 4,475,389 | 10/1984 | Harris | 340/620 X |
| 4,682,537 | 7/1987 | Snowball et al. | 99/285 X |
| 4,825,758 | 5/1989 | Snowball et al. | 99/285 X |
| 4,857,897 | 8/1989 | Chen | 99/285 X |

Primary Examiner—Jin F. Ng
Assistant Examiner—Jeffery A. Hofsass
Attorney, Agent, or Firm—Frost & Jacobs

[57] ABSTRACT

A perishable fluid container assembly is disclosed as including a timing mechanism in conjunction with a coffee pot, wherein a visible indicator device is energized while the coffee within the pot remains fresh. When the coffee pot is filled with fresh coffee, the visible indicator device first becomes energized, and stays energized even though the coffee pot is temporarily tipped on its side for the dispensing of coffee. After the predetermined time duration has expired, the visible indicator device is de-energized to indicate that the character or freshness of the coffee has expired. Additionally if the coffee pot becomes empty, the visible indicator device becomes de-energized after a short time delay.

16 Claims, 3 Drawing Sheets

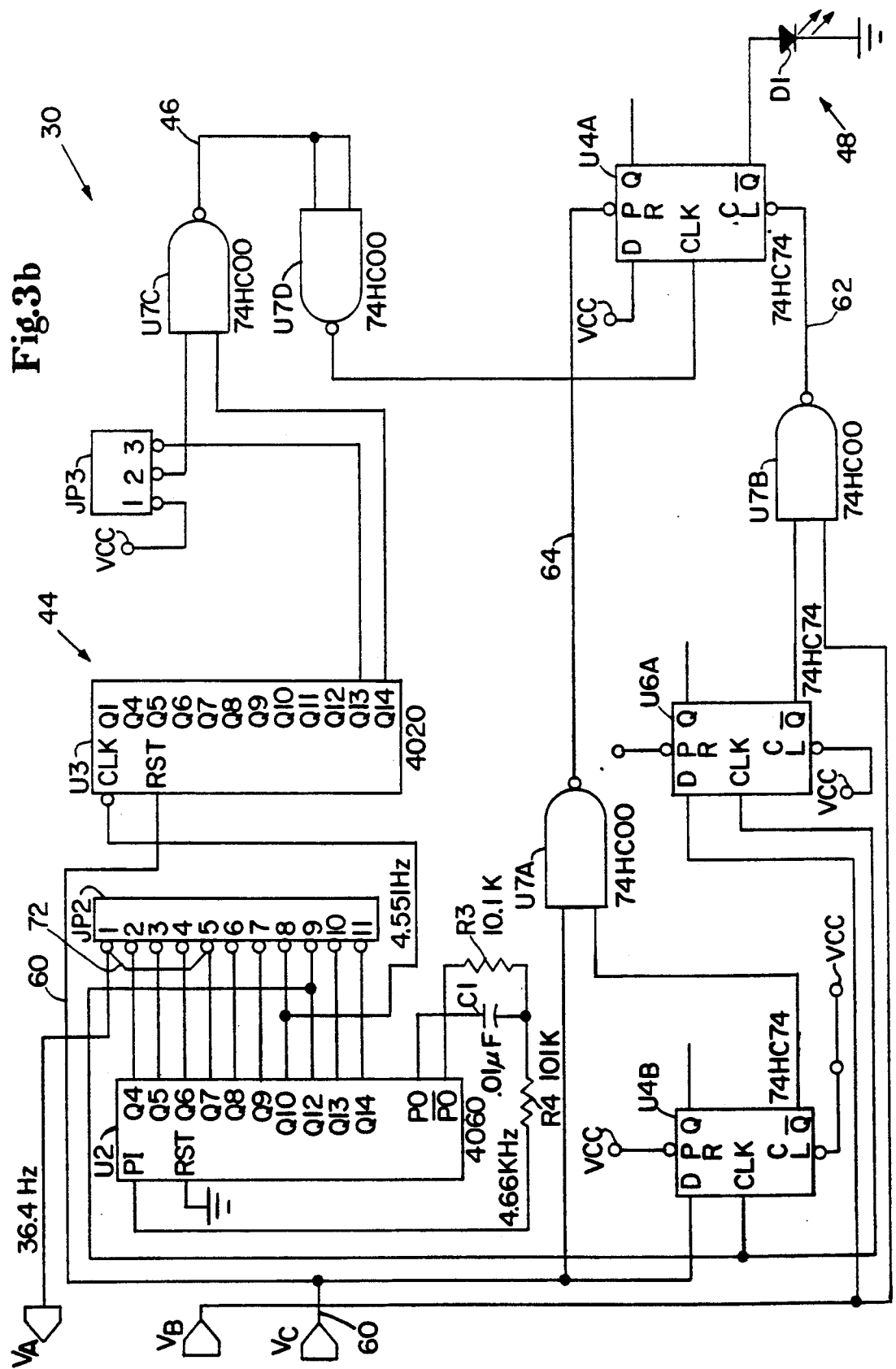

APPARATUS CONTAINING TIME-SENSITIVE FLUID WITH AN INDICATION AS TO THE STATE OF THE FLUID

TECHNICAL FIELD

The present invention relates to specialized fluid containers, and is directed more particularly to containers for fluids whose character changes relatively rapidly during the time that the fluids are inside the containers. The invention will be specifically disclosed in connection with a coffee pot, wherein the pertinent residence time of the coffee within the pot and the elapsed time after the volume of coffee within the pot has reached a predetermined level is monitored.

BACKGROUND OF THE INVENTION

Various automatic coffee brewing control systems are available in the industry. Some early systems incorporated spring-loaded mechanical timers to control brewing cycles to obtain various strengths of the coffee product (see, e.g., U.S. Pat. No. 2,448,149). Other coffee brewing systems have used liquid level sensors to control various functions. For example, the level of liquid in a coffee brewer is described in U.S. Pat. No. 3,060,835 to stop the flow of heated water into the brewer, after which a "ready" lamp would be energized after a time delay to allow residual water to pass through the brewer. In other devices (e.g., U.S. Pat. Nos. 4,682,537 and 4,825,758), the level of liquid in the water reservoir has been used to energize the heating element during the time the water is present within the reservoir.

In some commercial automatic coffee brewing systems, the amount of time that the brewed coffee remains "fresh" is very important. Rather than using brewing time to obtain varying strengths of the coffee product (as was done in the prior art), the critical time increment in the latter commercial applications begins when the coffee product has completed brewing and continues for the maximum amount of time for which the brewed coffee is considered fresh. The concept of "fresh" has varying definitions, however, the maximum time period for maintaining already-brewed coffee fresh is generally considered to be in a range of about thirty (30) to forty-five (45) minutes.

In applications where it is important to know how long a fluid has been in a container (e.g., perishable fluids such as coffee, chemical mixtures, carbonated beverages, adhesives, dairy products, etc.), conventional methods would dictate that an operator of the system start a timer at the time the container is filled, and later note the elapsed time when it is determined that the fluid is no longer fresh. As the container is moved to other locations, in order to dispense the fluid, the container and/or timer may not be visible or easily tracked in use, and persons using or dispensing the fluids may not have confidence in the freshness of the fluid. As used herein, the term "perishable" shall connote any fluid or mixture of fluids having a critical residence time or limited useable life of any sort in a container. While the example of coffee and "freshness" is set forth herein to illustrate the principles involved, it should be understood that other fluids may have various other critical characteristics which vary with time and which must be monitored. For example, adhesives may have optimum time following mixture during which they remain pliable, spreadable, or otherwise useable (e.g., epoxy resins and hardeners).

Heretofore, there has not been available a container which can independently and reliably detect when it is full of fluid (with its own self-contained means), and which can also independently monitor the condition of the fluid within the container for freshness or other characteristics during a predetermined period of time after being placed into the container. To be most useful, such container should also have the capability of discontinuing the "fresh" signal once the container is emptied of the fluid.

SUMMARY OF THE INVENTION

It is an object of the present invention to provide a container system which detects when a predetermined volume of fluid has been placed into its interior and then signal that fact for a predetermined length of time.

It is another object of the present invention to provide a container that provides an appropriate signal for a predetermined length of time after it has been filled with a fluid, and also discontinues that signal once the container is emptied of the fluid.

It is a further object of the present invention to provide a container which discontinues its signal once the volume of the fluid within the container falls below a predetermined level for a predetermined period of time.

It is yet another object of the present invention to provide a container that provides a signal for a predetermined length of time once it has been filled with a fluid, and discontinues that signal once the container has been continuously empty for a second predetermined period of time, wherein the fluid sensors, the timing device and the signaling device are provided integrally with the container, thereby providing a portable, self-contained control system which remains with the container at all times.

Additional objects, advantages and other novel features of the invention will be set forth in part in the description that follows and, in part, will become apparent to those skilled in the art upon examination of the following, or may be learned with the practice of the invention.

To achieve the foregoing and other objects, and in accordance with the purposes of the present invention as described herein, an improved fluid-holding container system is provided which signals for a predetermined length of time when it has been filled with a fluid, and which discontinues that signal once the container has been continuously empty for a second predetermined period of time. A plurality of associated fluid sensors, including one to detect when the container is sufficiently "full," and another to detect when the container is substantially "empty," the timing devices, and the signalling device are all permanently associated with the container. The container provides a portable, self-contained arrangement which can hold various fluids, such a coffee or tea, while giving a visual indication that the contents are "fresh", or safely and/or optimally useable, during the time period for which that is true.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of other different embodiments, and its several details are capable of modification in various aspects without departing from the scope of this invention. Accordingly, the drawing and descriptions are merely illustrative, and not restrictive in nature.

BRIEF DESCRIPTION OF THE DRAWING

The accompanying drawing incorporated in and forming a part of the specification illustrate several aspects of the present invention, and together with the description serves to explain the principles of the invention. In the drawing:

FIGS. 3a and 3b are electrical schematic diagrams of the electronics of the specialized coffee container of FIG. 1.

DETAILED DESCRIPTION OF THE PREFERRED EMBODIMENT

Reference will now be made to the drawings in detail, wherein like numerals indicate the same elements throughout the views.

Figure 1:
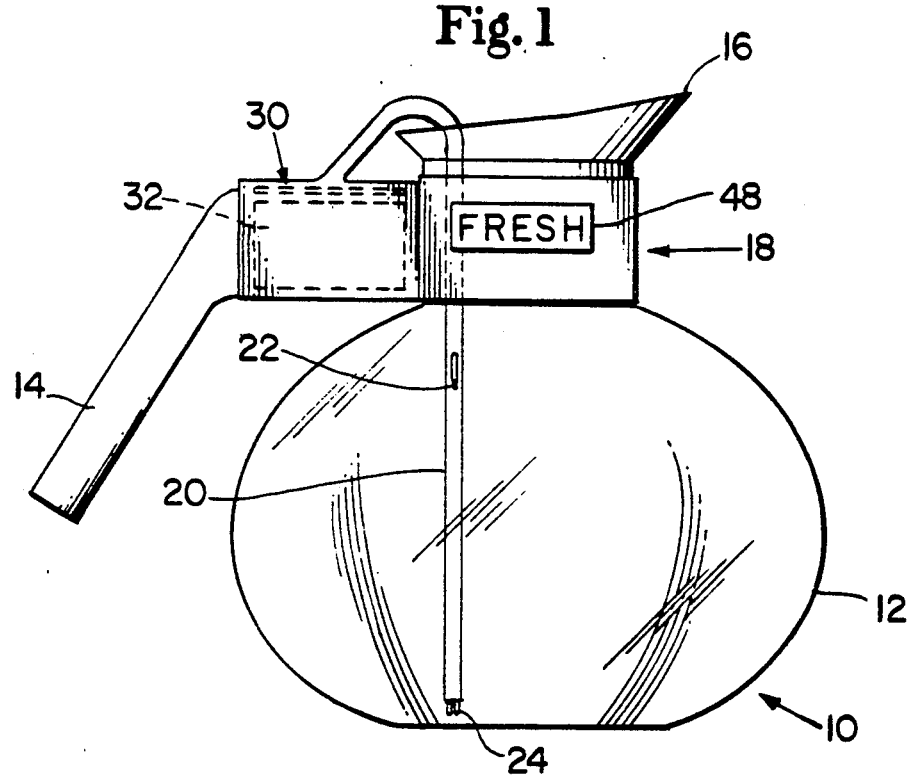
FIG. 1 is an elevational view of a specialized coffee container made in accordance with the present invention.

Particularly, FIG. 1 illustrates an apparatus which contains fluids having a limited useful life, generally designated by the numeral 10, which, from its overall outward shape, appears to be a relatively standard coffee pot. The apparatus 10 consists of a fluid container 12, a handle 14, and a spout 16. The handle 14 and spout 16 are part of the upper portion 18 of the overall apparatus 10, and upper portion 18 houses electronic assembly 30, electrical power supply 32, and means 48 for indicating a predetermined character or condition of the contained fluid, such as "freshness".

Upper portion 18 is also the terminating point of the fluid level probe 20. Fluid level probe 20 extends over the portion of the spout 16 which is nearest to the handle 14, and then down into the fluid container portion 12 of apparatus 10. Fluid level probe 20 preferably includes at least two level sensors, e.g., a "Full" level sensor 22, and an "Empty" level sensor 24. In the illustrated embodiment, the electronic assembly 30 comprises a printed circuit board with various electrical and electronic components. Also in the illustrated embodiment, the electrical power supply 32 comprises a self-contained, portable power source such as a battery pack.

Figure 2:
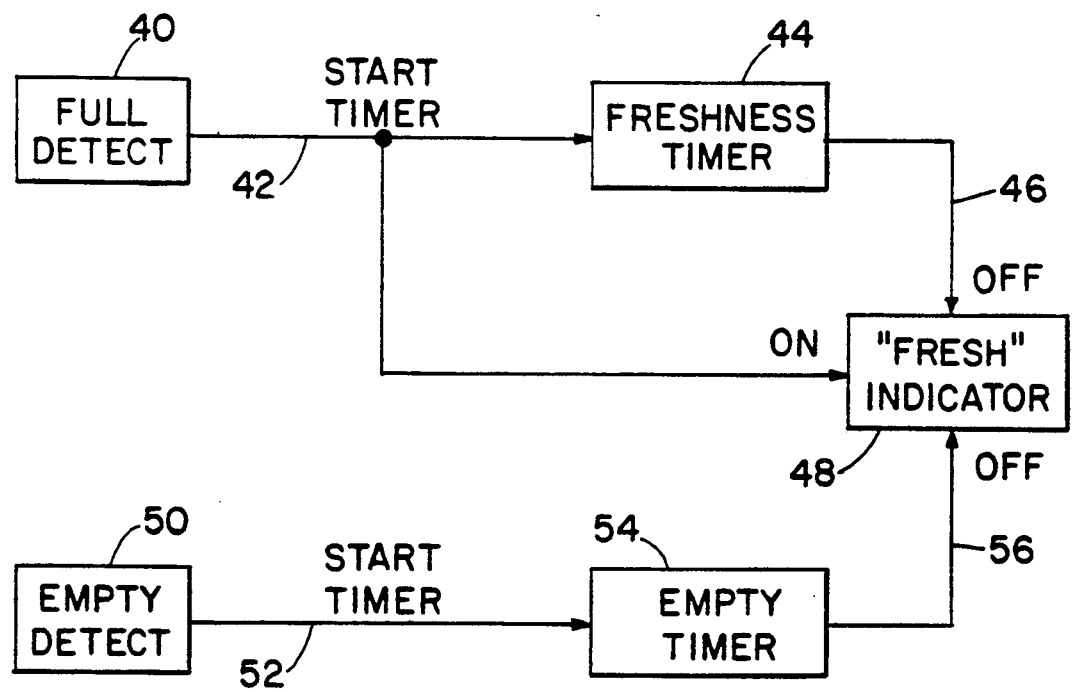
FIG. 2 is a flow chart of the logic flow in the electronics of the specialized coffee container of FIG. 1.
Figure 3A:
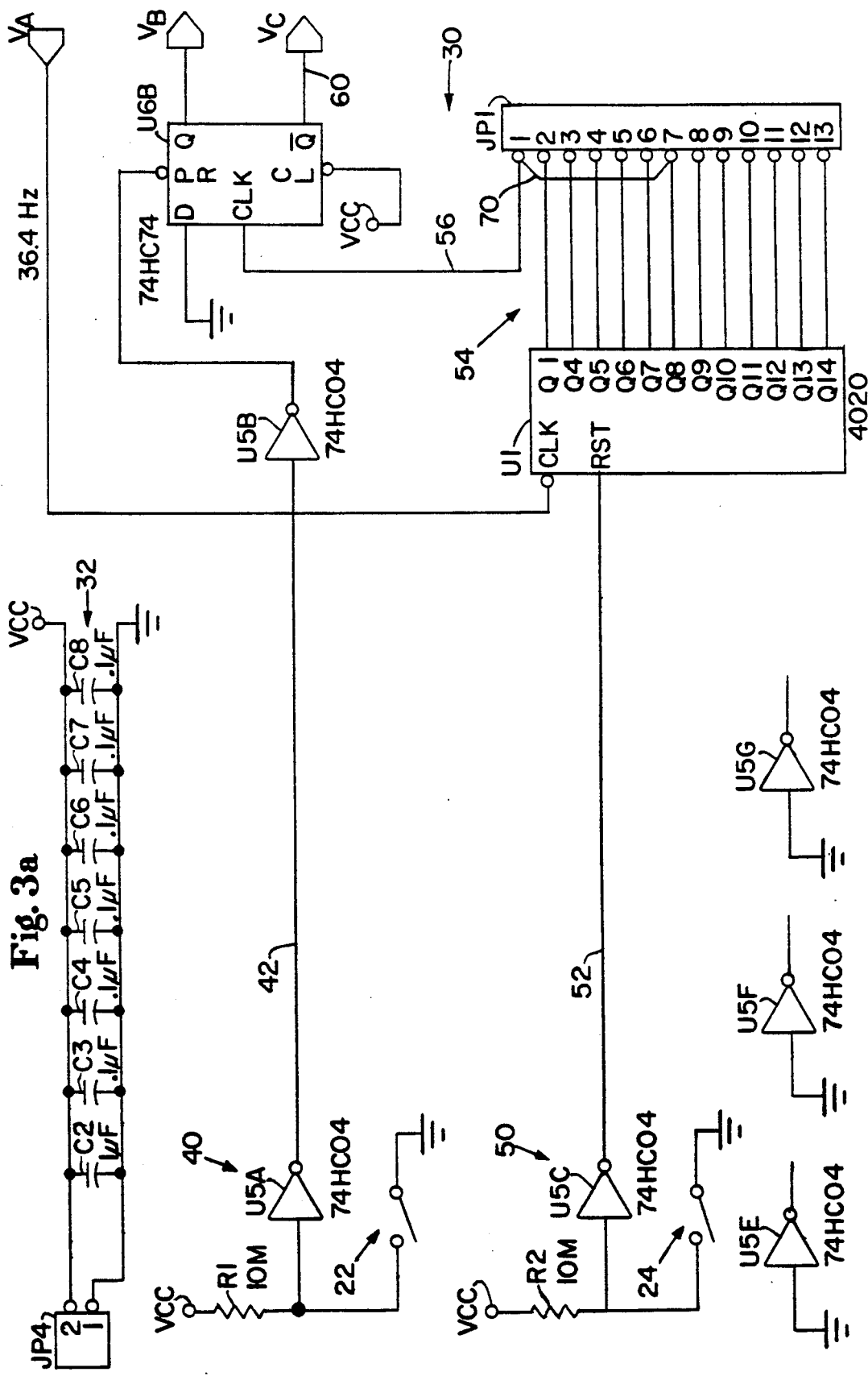

FIGS. 2, 3a, and 3b can be viewed together in order to best understand how the subject perishable fluid timer operates. In the illustrated circuit of FIGS. 3a and 3b, fluid sensors 22 and 24 act as normally open switches. In other words, fluid sensors 22 and 24 exhibit open contacts when they do not detect fluid, whereas their contacts close when fluid is detected within the container at their individual locations. Fluid sensors 22 and 24 can be electromechanical limit switches that have movable mechanical contacts, or they can be solid state electronic switches that have no moving parts. Fluid sensor 22 is illustrated as an upper or "Full" level sensor, and fluid sensor 24 is shown as a lower or "Empty" sensor. Whenever the Empty sensor 24 detects fluid its contact will be closed and the output of inverter U5C remains at its maximum value (which would be a voltage near the power supply rail of Vcc).

Logic gates U5A, U5B, U5C, U5D, U5E, and U5F make up a CMOS hex inverter, which is an integrated circuit that is commonly available in the industry, such as from National Semiconductor Corp. of Austin, Tex., under part number 74HC04. Resistor R2, level sensor 24, and invertor U5C make up the "Empty" detect circuit as shown as block 50 on FIG. 2. The output signal 52 of circuit 50 goes to its logic 1 state when fluid is detected by Empty level sensor 24, and goes to its logic 0 state when fluid is not sensed by the Empty level sensor 24.

Similarly, the upper or Full level sensor 22 acts to drive the input of the invertor U5A, which along with resistor R1 make up the "Full" detect circuit indicated as block 40 on FIG. 2. When the Full level sensor 22 detects fluid, output signal 42 of circuit 40 goes to its logic 1 maximum value, and, inversely, when the Full level sensor 22 does not detect fluid, signal 42 goes to its logic 0 minimum value.

To describe the operation of apparatus 10, it is assumed that fluid container 12 is empty at the initial condition. As fluid is directed into fluid container 12, the fluid level will first pass the Empty level sensor 24, thus causing signal 52 to go into its logic 1 state. At this time, an Empty timer (illustrated at block 54 in FIG. 2) will be reset into its inactive state. Empty timer 54 may preferably comprise an integrated circuit U1 and the jumper block JP1, which, in the coffee container embodiment, can be a standard 1 of 12 jumper block. Integrated circuit U1 preferably a CMOS ripple-carry binary counter commonly available in the industry, such as from National Semiconductor Corporation, generally under the part number 4020. Jumper block JP1 preferably includes a jumper 70 across two of its terminals, pin 1 and pin 7, which selects the Q8 output of counter U1. The output of the Empty timer block 54 is illustrated as signal 56, and is derived at pin 1 of jumper block JP1. At this time, signal 56 is inactive.

Upon complete filling of the fluid container 12, the Full level sensor 22 will become active, and force signal 42 into its logic 1 state. It should be understood that additional level sensors between "Full" and "Empty" could easily be included herein, in accordance with these same teachings. When signal 42 is inverted by invertor U5B, it causes integrated circuit U6B to be preset. Logic symbols U6A and U6B schematically illustrate CMOS D-type Flip-Flops, which are packaged in pairs on an integrated circuit commonly available in the industry from National Semiconductor Corporation, generally under the part number 74HC74.

At this time, main control signal 60 is forced into its active logic 0 state (main control signal 60 is an inverted signal). Main control signal 60 is generated at the NOT-Q output of Flip-Flop U6B on FIG. 3a of the illustrated embodiment, and is designated $V_C$ as it transists from FIG. 3a to FIG. 3b. When the main control signal 60 goes to its logic 0 state, it likewise forces signal 62 to go into its logic 0 state, thus turning on the indicator D1, which, in the coffee container application, might be a "FRESH" indicator 48. Indicator D1 is preferably a liquid crystal display so as to save electrical energy, however, it could alternatively be a Light Emitting Diode (LED) type display, or even an incandescent or fluorescent lamp, or any other electrically powered device. Alternatively, if fluid container 12 was designed to house an adhesive or chemical mixture, indicator 48 might signal "READY", "ACTIVE" or the like. This action occurs via the Q output of Flip-Flop U6B, which transists from FIG. 3a to FIG. 3b as $V_B$, where it toggles the D input of Flip-Flop U6A and the NAND gate U7B. Logic gates U7A, U7B, U7C, and U7D illustrate a set of CMOS quad two-input NAND gates, which are packaged on a single integrated circuit available from National Semiconductor Corporation under the part number 74HC00. At this time, signal 62 clears Flip-Flop U4A, and energizes indicator D1. Logic symbols U4A and U4B schematically illustrate CMOS D-type Flip-Flops, which are packaged in pairs on an integrated circuit that is commonly available from National Semiconductor Corporation by the part number 74HC74.

At this time, main control signal 60 also initiates the timer 44 (in this embodiment a "Freshness" timer) to start monitoring elapsed time. In this case, the critical elapsed time is the time since the coffee was poured into container 12. The Freshness timer, shown schematically as block 44 in FIG. 2, preferably comprises an integrated circuit U3 and jumper block JP3. Integrated circuit U3 is contemplated as a CMOS ripple-carry binary counter chip, commonly available in the industry from National Semiconductor Corporation, under the part number 4020. When initiated, counter U3 counts timing pulses, and its Q13 output changes state after a predetermined time period of fifteen minutes in the illustrated embodiment. Additionally, a second output Q14 of counter U3 will change state after a second predetermined time period of thirty minutes in the illustrated embodiment. Jumper block JP3 is preferably configured so that when its pins 1 and 2 are connected, a particular predetermined time period is selected (e.g., a thirty minute timer), and when its pins 2 and 3 are connected, a different predetermined time period is selected (e.g., a forty-five minute timer). The combination of a fifteen minute time delay with the thirty minute time delay provides a forty-five minute timer, and is accomplished by NAND gate U7C, thus generating the signal 46. If fluid container 12 is not emptied, during any particular timing cycle, freshness timer 44 will continue to monitor the time until signal 46 changes state. This will occur after either thirty minutes or forty-five minutes, depending upon the user-selectable jumper position of jumper block JP3. Once signal 46 changes state, its logic value is inverted by NAND gate U7D, and then input into the clock (CLK) input of Flip-Flop U4A, which resets the entire circuit for the next filling cycle, and de-energizes the indicator D1.

In normal operation of the present invention, it is contemplated that the perishable fluid timer apparatus 10 may be periodically picked up and tipped for dispensing some of its fluid contents through spout 16 (e.g., in a coffee container application especially). As this action occurs, the lower "Empty" level sensor 24 will periodically sense the low or empty level of fluid and, therefore, change state.

Under normal circumstances of tipping and pouring, the upper or "Full" level sensor 22 will be subjected to many variations of the "apparent" fluid level which would force its output signal 42 to also change state. When only the full level sensor's signal 42 changes state, the main control signal 60 does not change state. If signal 52 (the Empty signal) also changes state, due to the fact that the Empty level sensor 24 has also become uncovered, then the Empty timer 54 initiates its timing sequence. When this occurs, the outputs of counter U1 become active and start to change state. In a preferred embodiment, Empty timer 54 is set for a time interval of approximately 3.5 seconds. The setting can be adjusted, however, simply by positioning the jumper of jumper block JP1 in a different position. If the perishable fluid timer apparatus 10 is tipped over on its side in order to dispense some of its contents, the outputs of counter U1 will start to produce active pulses. If the perishable fluid timer apparatus 10 is then placed back into its normal, upright position, then the Empty level sensor 24 will again sense the fluid, and the start timer signal 52 will again go to logic 0, thereby automatically resetting Empty counter chip U1.

If the perishable fluid timer apparatus 10 truly becomes so empty that the fluid level no longer covers the Empty level sensor 24 then the timing pulse of counter U1 which has been selected through jumper block JP1 will be output as signal 56 into the CLK input of Flip-Flop U6B. Under this circumstance, the main control signal 60 will be set to logic 1, and the "Fresh" OFF signal 64 will be forced to its logic 0 state through Flip-Flop U4B and NAND gate U7A. Once this occurs, Flip-Flop U4A becomes preset, which resets the circuit for the next filling and de-energizes the indicator D1.

Integrated circuit U2, resistors R3 and R4, and capacitor C1 are all associated together for the purpose of producing a 4.66 Khz clock signal. Logic symbol U2 is preferably a CMOS ripple-carry binary counter and oscillator chip, available from National Semiconductor Corporation generally under the part number 4060. A second frequency of 4.551 Hz is generated by the Q10 output of counter U2, and is used to drive the CLK input of counter U3.

A third frequency of 36.4 Hz is generated by the Q7 output of counter U2. Jumper block JP2 preferably has a jumper 72 spanning two of its terminals, pin 1 and pin 5, wherein pin 5 is further electrically connected to output Q7 of counter U2. In this manner, the 36.4 Hz signal is produced at pin 1 of jumper block JP2, illustrated on FIG. 3b, which is designated $V_A$ as it transists from FIG. 3b to FIG. 3a. On FIG. 3a, the 36.4 Hz signal is used to drive the CLK input of counter U1. A fourth frequency of 1.14 Hz is generated by the Q12 output of counter U2, and is used to drive the CLK inputs of Flip-Flops U4B and U6A.

Inverters U5E, U5F, and U5D are spare gates of the CMOS hex invertor, and are not used in the circuit of the exemplary embodiment of FIGS. 3a and 3b. The signal Vcc is preferably a DC power supply voltage produced by the electrical power supply 32. Jumper block JP4 connects a set of batteries into the power supply rail of Vcc. Power supply rail Vcc has several filter capacitors shown on FIG. 3a, namely C2, C3, C4, C5, C6, C7, and C8, which are appropriately distributed on the printed circuit board of electronic assembly 30.

The foregoing description of a preferred embodiment of the invention has been presented merely for purposes of illustration and description. It is not intended to be exhaustive or to limit the invention to the precise form disclosed. Obvious modifications or variations are possible in light of the above teachings.

The embodiment was chosen and described in order to illustrate the principles and advantages of the invention, and a practical application for coffee brewing and dispensing, and to enable one of ordinary skill in the art to utilize the invention in various embodiments and with various modifications as are suited to the particular use contemplated. Accordingly, it is intended that the scope of the invention be defined by the claims appended hereto.

We claim:

1. An apparatus for containing fluid of limited useful life, wherein said fluid can be added to the apparatus and dispensed from the apparatus, said apparatus comprising:
    (a) a container for holding said fluid, said container having top and bottom portions and a dispensing opening;
    (b) first means for sensing fluid within said container at a predetermined level adjacent the bottom of said container;
    (c) second means for sensing fluid within said container at a predetermined level above said first means for sensing fluid; and
    (d) a control assembly integrally attached to said container and including:
        (i) a source of electrical power;
        (ii) an electronic assembly electrically connected to said electrical power source, said electronic assembly further comprising:
            (A) means for generating a first signal, indicative of a substantially empty container, said means for generating a first signal being responsive to said first means for sensing fluid;
            (B) means for generating a second signal, indicative of a predetermined non-empty fluid level within said container, said means for generating a second signal being responsive to said second means for sensing fluid;
            (C) first means for timing responsive to said first signal for initiating a first timing cycle in response to said first signal indicating a substantially empty container, said first means for timing automatically terminating said first timing cycle and being reset to its initial condition in response to said first signal indicating that said container is not empty, and said first means for timing continuing said first timing cycle until completion if said first signal continuously indicates an empty container throughout the first timing cycle, and generating a third signal upon completion of the first timing cycle;
            (D) second means for timing responsive to said second signal for initiating a second timing cycle in response to said second signal indicating a predetermined non-empty fluid level within said container, said second means for timing thereafter continuing said second timing cycle regardless of the state of said second signal, said second means for timing thereafter terminating said second timing cycle and being reset to its initial condition in response to said third signal indicating a continuously substantially empty container, said second means for timing continuing its second timing cycle until completion unless reset by said third signal, and generating a fourth signal upon completion of the second timing cycle;
            (E) means for generating an output signal, said output signal being responsive to said second, third, and fourth signals, wherein said output signal is energized in response to said second signal being indicative of a full container, and continuing in the energized state until de-energized by either the actuation of said third signal upon the completion of the first timing cycle or by the actuation of said fourth signal upon the completion of the second timing cycle; and
            (iii) indicator means actuated by said output signal.

2. An apparatus as recited in claim 1, wherein said first means for sensing fluid comprises a first liquid level switch, and said second means for sensing fluid comprises a second liquid level switch, and electrical connections link said first and second liquid level switches to the electronic assembly.

3. An apparatus as recited in claim 1, wherein said first means for sensing fluid comprises a first solid state liquid level sensor, and said second means for sensing fluid comprises a second solid state liquid level sensor, and electrical connections link said first and second solid state liquid level sensor switches to the electronic assembly.

4. An apparatus as recited in claim 1, wherein said electrical power source comprises a battery pack having electrical conductors for carrying the power supply current to and from said electronic assembly.

5. An apparatus as recited in claim 1, wherein said first timing means comprises an electronic timer having a timing cycle duration of approximately 3.5 seconds.

6. An apparatus as recited in claim 1, wherein said second timing means comprises an electronic timer having a timing cycle duration of approximately thirty minutes.

7. An apparatus as recited in claim 1, wherein said second timing means comprises an electronic timer having a timing cycle duration of approximately forty-five minutes.

8. An apparatus as recited in claim 1, wherein said indicator means comprises a light-emitting diode.

9. An apparatus as recited in claim 1, wherein said indicator means comprises a liquid crystal display.

10. An apparatus as recited in claim 1, wherein said container comprises a coffee pot having an open top through which fluid can be poured into or out of the container, and through which a portion of said control assembly extends.

11. An apparatus as recited in claim 10, wherein said first and second means for sensing fluid are attached to a common level sensing probe which extends through said open top to said bottom portion of the apparatus.

12. An apparatus as recited in claim 10, wherein said control assembly is attached adjacent said open top, and wherein said container further comprises a handle.

13. A method for containing fluid of limited useful life and sensing the level of that fluid within a container, wherein said fluid can be added to the container and dispensed from the container, said method comprising the steps of:
    (a) filling said container with a fluid, wherein a first fluid-detecting sensor indicative of a substantially empty container is activated as said fluid is added to the container, and continuing filling the container with a fluid until said container has been filled to a predetermined level wherein a second fluid-detecting sensor is activated;
    (b) initiating a first timing device responsive to said second fluid-detecting sensor upon the condition that said container is substantially filled to said predetermined level, wherein an indicating device is actuated during the predetermined timing period of said first timing device, and wherein the completion of the predetermined timing period of the first timing device is one of the conditions which can stop the actuation of said indicating device;

(c) discontinuing the filling of said container, and thereafter allowing said fluid to be dispensed from the container, while initiating a second timing device responsive to said first fluid-detecting sensor upon the condition that said container is substantially empty, wherein the completion of the second predetermined timing period of said second timing device is another of the conditions which can stop the actuation of said indicating device, and wherein the reoccurrence of said first fluid-detecting sensor determining that the container is not substantially empty before the completion of the predetermined timing period of said second timing device causes the predetermined timing period of the second timing device to be inactivated and reset to its initial non-timing condition without affecting said indicating device; and (d) inactivating, upon the occurrence of any of the above conditions which stops the actuation of said indicating device, and resetting to their initial non-timing conditions both first and second timing devices.

14. A method as recited in claim 13, wherein the predetermined timing period of said first timing device is approximately 30 minutes and the predetermined timing period of said second timing device is approximately 3.5 seconds.

15. A method as recited in claim 13, wherein the predetermined timing period of said first timing device is approximately 45 minutes and the predetermined timing period of said second timing device is approximately 3.5 seconds.

16. A method for containing fluid of limited useful life and sensing the level of that fluid within a container, wherein said fluid can be added to the container and dispensed from the container, said method comprising the steps of:

(a) filling said container with a fluid, wherein a first fluid-detecting sensor indicative of a substantially empty container is activated as said fluid is added to the container, and continuing filling the container with a fluid until said container has been filled to a predetermined level wherein a second fluid-detecting sensor is activated;

(b) initiating a first timing device responsive to said second fluid-detecting sensor upon the condition that said container is substantially filled to said predetermined level, wherein an indicating device is actuated upon the completion of the predetermined timing period of the first timing device; and (c) discontinuing the filling of said container, and thereafter allowing said fluid to be dispensed from the container, while initiating a second timing device responsive to said first fluid-detecting sensor upon the condition that said container is substantially empty, wherein the completion of the second predetermined timing period of said second timing device prevents the actuation of said indicating device and also resets to their initial non-timing conditions both said first and second timing devices.

* * * * *